United States Patent [19]
Goetz

[11] 3,711,076
[45] Jan. 16, 1973

[54] PIPE CUTTING MACHINE

[76] Inventor: Fay M. Goetz, 16542 Summerdale, La Mirada, Calif. 90638

[22] Filed: Dec. 4, 1970

[21] Appl. No.: 95,162

[52] U.S. Cl. ..............................266/23 NN, 228/29
[51] Int. Cl. ...............................................B23k 7/04
[58] Field of Search...........266/23 NN, 23 HH, 23 N; 228/29; 219/60 A, 66, 59, 63; 82/4 C

[56] References Cited

UNITED STATES PATENTS

| | | | |
|---|---|---|---|
| 3,514,086 | 5/1970 | Clanin | 266/23 N |
| 3,202,190 | 8/1965 | Gill | 82/4.3 X |
| 3,028,154 | 4/1962 | Johnson | 266/23 HH |
| 3,207,408 | 9/1965 | Thome et al. | 228/29 |
| 3,572,668 | 3/1971 | LeBlanc | 266/23 NN |

*Primary Examiner*—Frank T. Yost
*Attorney*—Beehler, Arant & Jagger

[57] ABSTRACT

A metal pipe cutting machine for cutting a large diameter pipe in a circumferential manner by the use of a cutting torch rotatably supported to travel about the interior surface of the pipe. An adjustable mounting unit for mounting the machine within the pipe provides for manually decoupling the rotatable support for the cutting torch from rotatable driving means provided for the machine to enable the cutting torch to be freely rotated during the setting-up of the machine within the pipe. This permits the cutting torch to be aligned to travel about the interior surface of the pipe along a predetermined circumferential path and held in the aligned position by the adjustments provided on the mounting unit when the rotatable support for the cutting torch is manually coupled to the rotatable driving means during the cutting operation of the machine.

7 Claims, 7 Drawing Figures

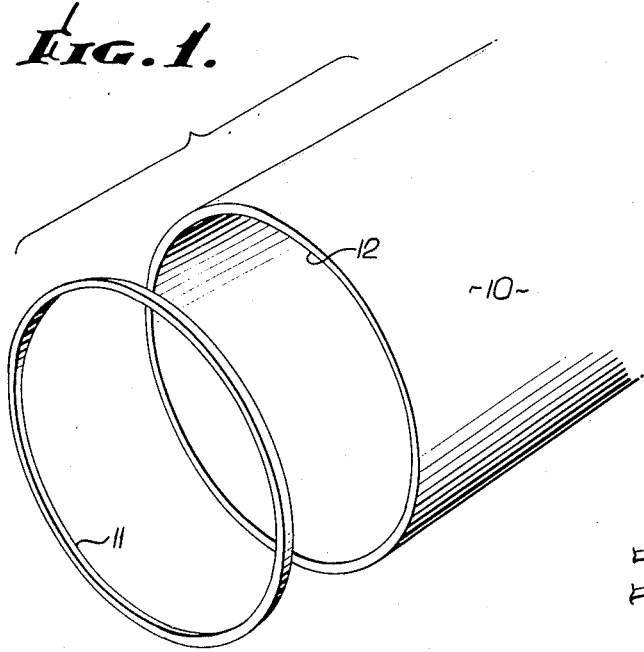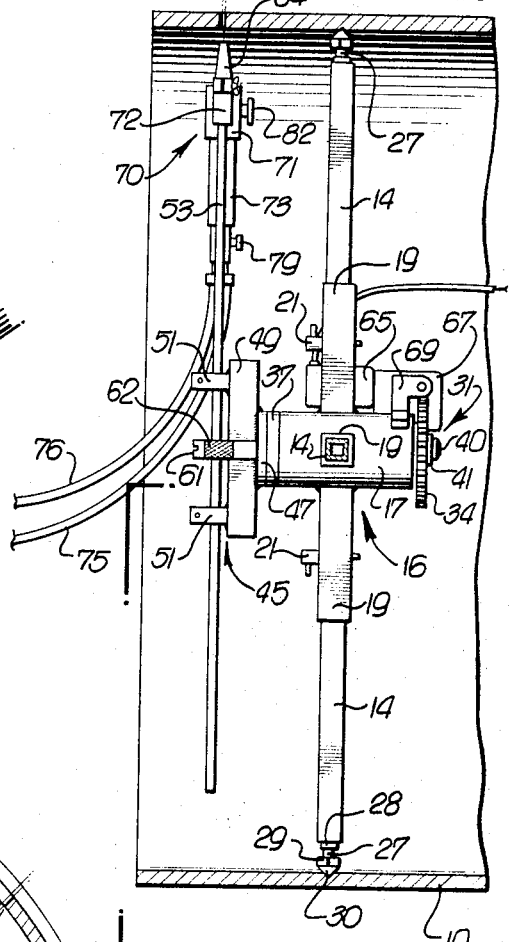

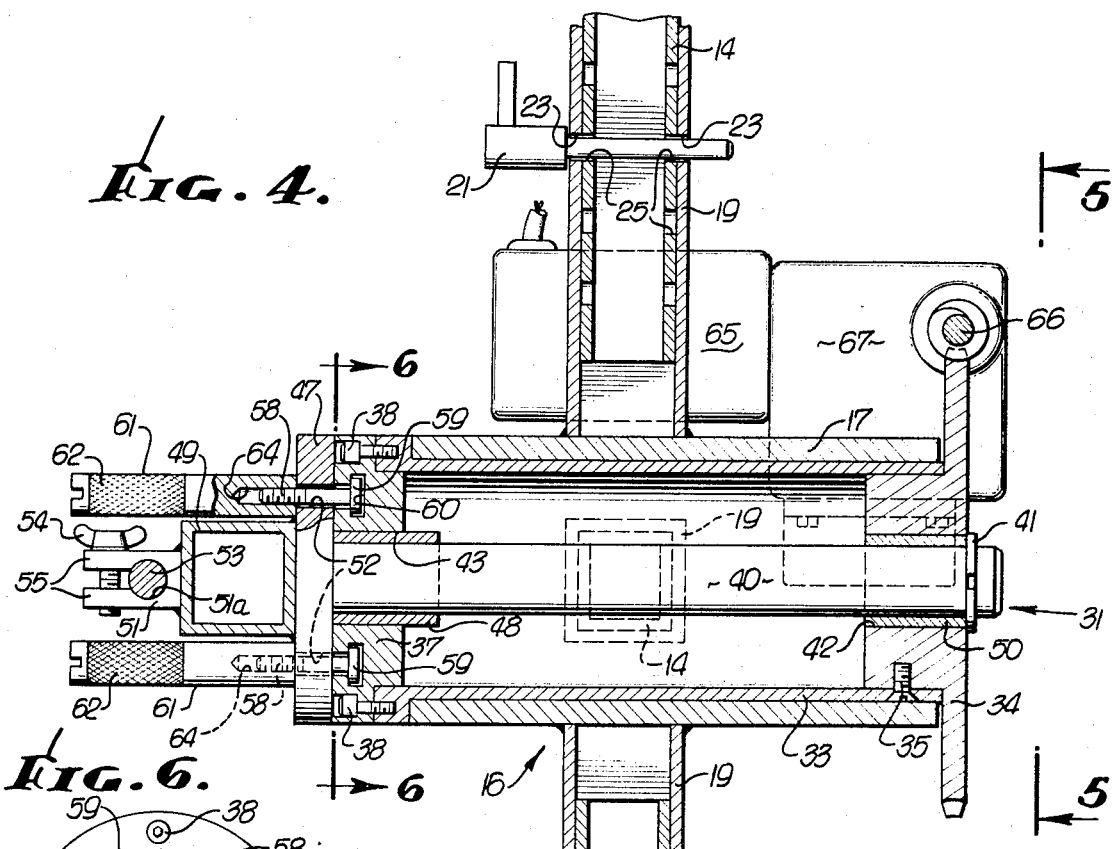
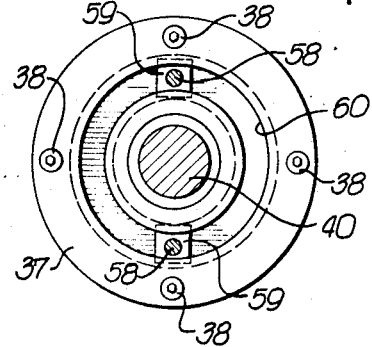
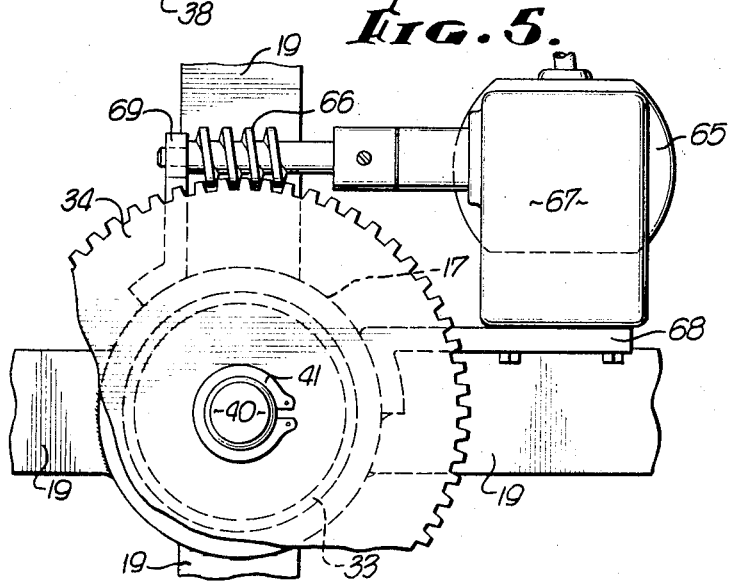
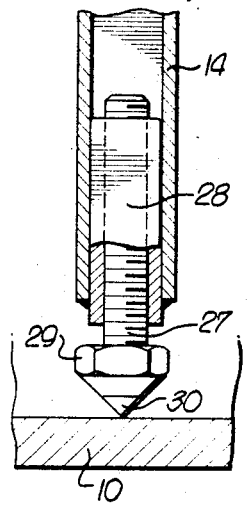

PIPE CUTTING MACHINE

This invention relates to metal pipe cutting machines and more particularly to a simplified structure for circumferentially cutting a large diameter pipe by supporting and controlling a cutting torch to advance about the interior surface of the pipe.

The cutting of a section of large diameter pipe to a desired length or the cutting off of the end of such a section of pipe in order to provide a straight cut on the edge thereof has previously been performed in the art by supporting a cutting torch on the exterior surface of the pipe in such a manner that the cutting torch is guided to cut along the exterior surface as it is either manually or automatically moved circumferentially about the pipe. The use of such structure for cutting a large diameter pipe presents many problems, particularly if the pipe has to be cut while installed below ground level, for example, in which event it is necessary to remove the dirt or other material as much as three or four feet away from around the pipe in order to provide clearance for setting up the supporting structure for the cutting torch on the outer surface of the pipe and permitting the torch to travel completely around the pipe in order to perform the cut. Furthermore, when the pipe is installed in the ground it is usually provided with a coating such as coal tar which must be removed in order to permit the support for the cutting torch to be properly mounted in position on the outer surface of the pipe. If the pipe is lying in a storage yard the use of such an externally supported pipe cutter requires the use of power lifting equipment to lift the large diameter pipe such that it can be held at a sufficient height above the ground so as to permit the cutting torch to move completely around the pipe. It should be further appreciated that because of the requirement that the equipment be placed outside the large diameter pipe, the apparatus provided for supporting and guiding the cutting torch is necessarily spaced apart over a wide area resulting in the equipment being bulky such that one man cannot handle the setting up of the equipment on the pipe.

The present invention overcomes these difficulties of cutting large diameter pipes by providing a pipe cutting machine which can be mounted within the pipe such that the cutting torch is controlled to cut the wall of the pipe along the interior circumferential surface thereof. Since the interior surface of the pipe is generally smooth it provides a better surface against which to mount the machine and also provides an aligning surface which can be used for setting up the machine so that the plane of the cut will be at the desired angle relative to the axis of the pipe. Since the machine is positioned within the pipe so as to rotate the cutting torch about the axis of the pipe, the apparatus for supporting and guiding the cutting torch can be made much more compact and lighter in weight such that the machine can be easily handled and set up by one man. Moreover, if the pipe is installed in the ground, only a very small portion of the exterior surface of the pipe has to be exposed by the removal of dirt in order for the cutting machine to operate, and if the pipe is resting on its side in a yard there is no need to lift the pipe very high above the ground since there is no need to provide clearance for the travel of the cutting torch about the outer surface of the pipe.

Accordingly, one of the objects of the present invention is to provide a simplified, less bulky and less cumbersome pipe cutting machine for circumferentially cutting a large diameter pipe.

Another object of the present invention is to provide a machine which can be easily set up within a large diameter pipe for enabling a cutting torch to automatically sweep about a predetermined path within the interior of the pipe in order to cut off the end thereof.

Another object of the present invention is to provide a torch cutting machine that can be readily adapted to support a cutting torch for automatically cutting along the circumference of the interior surfaces of large diameter pipes that have a wide range of diameter sizes.

Briefly, the pipe cutting machine of the present invention provides for cutting a large diameter metal pipe to a desired length by supporting and controlling a cutting torch to advance circumferentially along a predetermined path about the interior surface of the pipe. The pipe cutting machine is supported within the pipe by a mounting unit including a stationary hub and a plurality of adjustable arms. A drive unit that is rotatably mounted within the hub is driven at a relatively slow speed by a motor driving through a reduction gear train. A support unit for the cutting torch is mounted on the same rotatable axis as the drive unit and is coupled to be either in an engaged or a disengaged rotatable drive relationship with the drive unit. The support unit is coupled to be disengaged from the drive unit to enable the cutting torch to be freely rotated in order to permit the cutting torch to be aligned along a predetermined path about the interior surface of the pipe. The cutting torch is held in this aligned position by adjusting the adjustable arm on the mounting unit such that the ends of the arms bear against the interior surface of the pipe. The support unit is coupled to be engaged to the drive unit in order to automatically slowly advance the cutting torch circumferentially about the interior surface of the pipe in accordance with the alignment to perform the operation of cutting the pipe.

The specific nature of the present invention as well as other objects, advantages and features thereof will become apparent from the following description and the accompanying drawings in which:

FIG. 1 illustrates a section of a pipe and a portion thereof that has been cut off by the use of the pipe cutting machine of the present invention;

FIG. 2 is a side view showing of the pipe cutting machine of the present invention installed in position within the pipe;

FIG. 3 is a front view showing of the pipe cutting machine of the present invention taken generally along the lines 3—3 of FIG. 2;

FIG. 4 is a sectional view of the drive and supporting apparatus for the pipe cutting machine taken along lines 4—4 of FIG. 3;

FIG. 5 is an end view of the driving gear mechanism taken along the lines 5—5 of FIG. 4;

FIG. 6 is a sectional view of the clamping mechanism taken along lines 6—6 of FIG. 4; and FIG. 7 is a detailed showing of the end adjustment for the supporting rods taken along lines 7—7 of FIG. 3.

Referring to FIG. 1 a section of metal pipe 10 having a large diameter which may be anywhere from 30 inches to as much as 120 inches, for example, is shown. The section of pipe 10 is shown to have had its end 11 cut off to form a straight clean cut circumferential edge 12 on pipe 10, as needed for providing a proper length section of pipe, or for trueing the edge 12 of the section of pipe for mating with a similarly formed edge on another section of pipe to which it is to be joined.

The internal pipe cutting machine of the present invention which is used to cut off the end 11 of the section of pipe 10 shown in FIG. 1 is shown installed within the section of pipe in FIGS. 2 and 3. The machine is supported within the pipe by a central mounting unit 16 comprising a cylindrical hub 17 from which four equally spaced arm sockets 19 radiate. An adjustable length arm 14 extends from each of the arm sockets 19. The arm sockets, as well as the arms 14 which have a sliding fit therein, are shown in FIG. 4 as being formed of channel structure having a square cross-section but could just as well be formed of structure having a circular cross-section. Each arm 14 is adjustably held with a portion of its inner end in one of the arm sockets 19 by pin 21 whose body passes through a set of holes 23 provided on opposite sides of the arm sockets 19 and through a similar set of holes 25 provided on the opposite sides of the arm 14. Several sets of holes 25 are spaced along the end portion of arm 14 such that the arm can be extended in increments corresponding to the spacing of the sets of holes. The effective length of the arms 14 is made to be further adjustable so as to provide a pressure contact against the inner surface of the pipe by threaded bolts 27 which, as shown in FIG. 7, are screwed into sleeves 28 welded in position within the outer end of each of the arms 14. The heads 29 of the bolts 27 are provided with conical tips 30 formed of hard metal such as carbide.

Continuing with the description of the central mounting unit 16 shown in FIG. 4, the hub 17 is stationary and serves as a bearing for a rotatable drive unit 31 comprised of a cylindrical housing 33 which has a gear 34 securely fixed on the outer end thereof by means of screws 35 and which has an end cover 37 securely fixed to the inner end thereof by screws 38. A variable speed motor 65 is connected to reduction gear box 67 which is held by a bracket 68 attached to the stationary hub 17. The reduction gear train in gear box 67 drives worm gear 66 whose outer end is supported by a bracket 69 (FIG. 5) attached to hub 17. It should be noted that when motor 65 is energized the rotatable drive unit 31 is positively driven through reduction gear box 67, worm gear 66 and gear 34. Positioned against the end cover 37 of the drive unit 31 is a support unit 45 for a rod 53 which has the cutting torch 70 attached to the end thereof. The support unit 45 comprises a circular plate 47 integrally formed with a central shaft 40 on one face thereof and provided with a length of square channel 49 welded on the other face thereof. The support unit 45 is positioned with its circular plate 47 butting up against the end cover 37 and with the inner end of its central shaft 40 mounted in a sleeve bearing 48 secured in an axial opening 43 in cover 37 and with the end of shaft 40 mounted in a sleeve bearing 50 secured in an axial opening 42 in gear 34. The support unit 45 is held in a fixed axial position relative to drive unit 31 by a snap ring 41 which fits in a groove provided on the end of shaft 40. The circular plate 47 is provided with a pair of diametrically spaced openings 52 to receive the body portions of a pair of bolts 58 whose heads 59 are inserted in a T-shaped annular slot 60 provided in cover 37. The heads 59 of bolts 58 are positioned in annular opening 60 by a removable plug (not shown) on the inner face of end cover 37. A pair of posts 61 provided with knurled end portions 62 have internally threaded bores 64 on the other ends thereof for receiving the ends of the body portions of the threaded bolts 58 that extend beyond the face of plate 47.

It should be understood that manual tightening of the posts 61 causes the circular plate 47 to be clamped to end cover 37 and manual loosening of posts 61 causes the circular plate 47 to rotate freely relative to end cover 37. As will be more clearly described hereinafter, this arrangement for mounting the support unit 45 enables it to be either engaged with the drive unit 31 so as to be positively rotated therewith to slowly advance the cutting torch 70 during the cutting operation, or to be disengaged from the drive unit 31 such that it can be freely rotated manually with the face of the circular plate 47 sliding over the face of cover 37, with the heads 59 of the screws 58 free to slid within the T-shaped annular slot 60 in end cover 37 (FIG. 6), and with the shaft 40 free to rotate in sleeve bearings 48 and 50. Since the variable speed motor 65 drives the support unit 45 through the reduction gear train in box 67 at a typically relatively slow speed of approximately 12 inches per minute for a steel pipe having a ⅝ inch thick wall, for example, such a free manual rotating movement of the support unit 45 is used to quickly reposition the cutting torch 70 during the setting up of the pipe cutting machine ad is also used when the operator finds it desirable to quickly reposition the cutting torch 70 during the cutting operation as will be described hereinafter. It should thus be clear that after the support unit 45 has been manually positioned it is again clamped by the tightening of posts 61 to slowly rotate with the drive unit 31 which is driven by the motor 65 driving the gear 34 by worm gear 66 through reduction gear box 67.

Referring to FIGS. 3 and 4, the support unit 45 for the cutting torch 70 is shown to include a pair of slotted brackets 51 respectively attached near the outer ends of the length of square channel 49. The slotted brackets are provided with circular openings 51a to hold the cutting torch rod 53 which is securely held therein by wing-headed bolts 54 which span the ends 55 of each of the slotted brackets 51.

The cutting torch 70 includes a moveable cutting torch head 73 which is moveably held in a bracket 71 which is attached by a clamp 72 to the end of the rod 53. In the preferred embodiment of the invention an oxygen hose 75 and an acetylene hose 76 are attached to the torch head 73. Near the lower end of the torch head 73 is the on-off valve 79 for the oxygen and the on-off valve 80 for the acetylene. The torch head 73 is provided with a rack 81 on the lower end thereof which meshes with teeth (not shown) provided on knob 82 which when manually rotated enables the head 73 to be moved in either direction parallel to the rod 53 such that the tip 84 on the cutting torch head 73 can be manually positioned relative to the inner surface of pipe 10.

As is well known in the art as the tip 84 of the torch head 73 slowly advances past the surface of the pipe 10, during the time the pipe cutting machine is automatically operating to cut the wall of the pipe, the spot on the metal wall on which the acetylene flame provided by the torch head 73 is directed is heated but not actually melted. Then a fine stream of oxygen from the torch head 73 is directed on the hot metal. The metal touched by the stream of oxygen burns through leaving a straight clean-cut edge 12 on the end of pipe 10.

When the cutting torch 70 is to be set up in the pipe 10 to perform a cut, the arms 14 of the mounting unit 16 are initially positioned to approximately the desired radial distance short of having their carbide tips 30 contact the inner surface of the pipe 10 by removing the pin 21 that holds the arms 14 in the arm sockets 19 and adjusting the arms 14 such that holes 25 therein are aligned with holes 23 in the arm sockets 19 and then reinserting the pins 21. The machine is then positioned within the pipe so as to rest on the carbide tips 30 of its lower arm 14. The machine is temporarily set up in its proper position within the pipe 10 by rocking the upper arm 14 in a direction parallel to the axis of the pipe to determine the approximate point at which the end is nearest to the inner surface thereof. The adjustable bolt 27 on the end of the upper arm 14 is then rotated until the carbide tip 30 on the head 29 thereof contacts the inner surface of the pipe with sufficient pressure to securely hold the machine in position within the pipe 10. The temporary set up procedure is then repeated for the other arms 14 at 90° to the first, resulting in the machine being securely mounted in the pipe. The posts 61 are then unscrewed to disengage the support unit 45 from the rotatable drive unit 31 so that the rod 53 with the cutting torch 70 mounted on the end thereof can rotate freely and be properly aligned. This is accomplished by using an instrument such as a square, for example, with one length thereof against the extended free end of the rod 53 while it is in a vertical position, for example, and with the other leg of the square butting along the inner wall of pipe 10 in a direction parallel to the axis thereof. To the extent that the rod 53 is not properly aligned, the bolts 27 on the ends of the arms 14 are backed up to reposition the arms 14 so as to properly align the rod 53. This procedure is repeated while the rod 53 is held in a horizontal position, for example, at 90° to the first position. As a result of having aligned the rod 53 relative to the inner surface of the pipe, cutting torch 70 is now properly set up to cut the pipe along a predetermined circular path that for this particular alignment lies in a plane normal to the axis of the pipe.

As illustrated in FIG. 3 it is not uncommon for pipes of large diameter sizes to be out of round by an inch or even more. This requires that the operator must manually change the radial position of the moveable head 73 of the cutting torch by the use of knob 82 during the cutting operation to the extent that this variation in roundness is not accounted for in the set up inasmuch as it is important that the acetylene flame, and consequently the tip 84 of the torch head 73, be maintained within a given tolerable distance from the inner surface of the pipe in order to obtain a good clean cut. Accordingly, such out of roundness can be handled in part of the set up by loosening posts 61 and providing for swinging the rod 53 about the axis of the drive unit 31 and determining whether the tip 84 of torch head 73 will be maintained within the tolerable range near the inner surface of the pipe when it is subsequently rotated during the cutting operation by the motor 65 driving the drive unit 31 through the reduction gear train in box 67. It should be appreciated that the axis of rotation of the cutting torch 70 can be more accurately centered to accommodate the out of roundness of the pipe by transversely moving the hub 17 of the central mounting units 16 in the direction along any one of the arms 14 by loosening the carbide tip 30 of the opposing arm 14 while not upsetting the alignment previously provided for rod 53 which has the cutting torch 70 attached thereto.

It should be noted that after the pipe cutting machine has been properly set up and cutting torch 70 has already commenced the cutting of the pipe that there are occasions when the torch 70 fails to properly cut the wall of the pipe due to imperfections such as slag that may be in the metal. When this occurs it is necessary to unscrew the post 61 so as to permit the support unit 45 for the cutting torch 70 to rotate freely, thus enabling the operator to reset the torch back so that it can again heat the spot on the metal and obtain the desired cut.

While the description has been concerned with a particular structural embodiment of the invention it is to be understood that many modifications and variations in construction and arrangement may be provided for without departing from the spirit and scope of the invention or sacrificing any of its advantages. The invention is, therefore, considered as including all such modifications and variations coming within the scope of the appended claims.

What is claimed is:

1. A pipe cutting machine for cutting a large diameter metal pipe by supporting and controlling a cutting torch to advance along a predetermined circumferential path about the interior surface of the pipe, comprising:

a mounting unit including a hub on the axis thereof and a plurality of adjustable arms extending radially outwardly therefrom for mounting the pipe cutting machine within the pipe;

a drive unit rotatably mounted on the axis of said hub;

a reduction gear train;

a motor for rotating said drive unit through said reduction gear train;

a support unit for the cutting torch rotatably mounted on the same axis as the drive unit; and coupling means including manually adjustable means for coupling the end of said support unit to the end of said drive unit in an engaging or disengaging rotatable drive relationship;

said coupling means being rendered operable by said manually adjustable means to disengage the end of said support unit from the end of said drive unit to permit the cutting torch to be freely rotated in order to align the cutting torch to travel along a predetermined circumferential path about the interior surface of said pipe during the time the machine is being set up within the pipe; said cutting torch being held in said aligned position by adjusting the adjustable arms on said mounting unit such that the ends thereof bear against the interior surface of said pipe; and said coupling means being rendered operable by said manually adjustable means to engage the end of said support unit to the end of said drive unit in order to automatically slowly advance said cutting torch circumferentally about the interior surface of said pipe in accordance with said alignment during the time the machine is operating to cut the pipe.

2. The invention in accordance with claim 1 wherein said mounting unit includes arm sockets extending radially outwardly therefrom, wherein said adjustable arms are slideably positioned in said arm sockets, and wherein pins passing through openings in said arm sockets and openings in said adjustable arms hold said adjustable arms in varying extended radial positions for mounting said pipe cutting machine within said pipe.

3. The invention in accordance with claim 2 wherein elements threadable engaging the ends of each of said adjustable arms provided for further extending radial adjustment of said adjustable arms.

4. A pipe cutting machine for cutting a large diameter metal pipe by supporting and controlling a cutting torch to advance along a predetermined circumferential path about the interior surface of the pipe, comprising:
- a mounting unit including a hub on the axis thereof and a plurality of adjustable arms extending radially outwardly therefrom for mounting the pipe cutting machine within the pipe;
- a drive unit rotatably mounted on the axis of said hub;
- a reduction gear train;
- a motor for rotating said drive unit through said reduction gear train;
- a support unit for the cutting torch, rotatably mounted on the same axis as the drive unit;
- a radially disposed rod-like member adjustably supported by said support unit, said cutting torch being attached to the end of said rod-like member; and
- coupling means including manually adjustable means for coupling said support unit to said drive unit in an engaging or disengaging rotatable drive relationship;
- said coupling means being rendered operable by said manually adjustable means to disengage said support unit from said drive unit to permit the cutting torch to be freely rotated in order to align the cutting torch to travel along a predetermined circumferential path about the interior surface of said pipe during the time the machine is being set up within the pipe;
- said cutting torch being held in said aligned position by adjusting the adjustable arms on said mounting unit such that the ends thereof bear against the interior surface of said pipe; and
- said coupling means being rendered operable by said manually adjustable means to engage said support unit to said drive unit in order to automatically slowly advance said cutting torch circumferentially about the interior surface of said pipe in accordance with said alignment during the time the machine is operating to cut the pipe.

5. A pipe cutting machine for cutting a large diameter metal pipe by supporting and controlling a cutting torch to advance along a predetermined circumferential path about the interior surface of the pipe, comprising:
- a mounting unit including a hub on the axis thereof and a plurality of adjustable arms extending radially outwardly therefrom for mounting the pipe cutting machine within the pipe;
- a drive unit rotatably mounted on the axis of said hub;
- a reduction gear train;
- a motor for rotating said drive unit through said reduction gear train;
- a support unit for the cutting torch rotatably mounted within and on the same axis as said drive unit; and
- coupling means including manually adjustable means having threaded members for coupling said support unit to said drive unit is a disengaging or engaging rotatable drive relationship in which they have a fixed axial relationship;
- said coupling means being rendered operable by loosening of the threaded members of said manually adjustable means to disengage said support unit from said drive unit to permit the cutting torch to be freely rotated in order to align the cutting torch to travel along a predetermined circumferential path about the interior surface of said pipe during the time the machine is being set up within the pipe;
- said cutting torch being held in said aligned position by adjusting the adjustable arms on said mounting unit such that the ends thereof bear against the interior surface of said pipe; and
- said coupling means being rendered operable by tightening of the threaded members of said manually adjustable means to engage said support unit to said drive unit in order to automatically slowly advance said cutting torch circumferentially about the interior surface of said pipe in accordance with said alignment during the time the machine is operating to cut the pipe.

6. A pipe cutting machine for cutting a large diameter metal pipe by supporting and controlling a cutting torch to advance along a predetermined circumferential path about the interior surface of the pipe, comprising:
- a mounting unit including a hub on the axis thereof and a plurality of adjustable arms extending radially outwardly therefrom for mounting the pipe cutting machine within the pipe;
- a drive unit rotatably mounted on the axis of said hub;
- a reduction gear train;
- a motor for rotating said drive unit through said reduction gear train;
- a support unit for the cutting torch, said support unit having a shaft rotatably mounted within and on the same axis as the drive unit; and
- coupling means including manually adjustable means for coupling said support unit to said drive unit in an engaging or disengaging rotatable drive relationship;

said coupling means being rendered operable by said manually adjustable means to disengage said support unit from said drive unit to permit the support unit to be freely rotated on its shaft in order to align the cutting torch to travel along a predetermined circumferential path about the interior surface of said pipe during the time the machine is being set up within the pipe;

said cutting torch being held in said aligned position by adjusting the adjustable arms on said mounting unit such that the ends thereof bear against the interior surface of said pipe; and said coupling means being rendered operable by said manually adjustable means to axial engage said support unit to said drive unit in order to automatically slowly advance said cutting torch circumferentially about the interior surface of said pipe in accordance with said alignment during the time the machine is operating to cut the pipe.

7. The invention in accordance with claim 6 wherein said coupling means includes a T-shaped annular slot provided about the axis of said drive unit and connecting means disposed parallel to said axis and having an enlarged end slidably mounted in said annular slot for holding said support unit adjacent said drive unit, and wherein said manually adjustable means provides either for disengaging said support unit from rotating with said drive unit by permitting the enlarged end of said connecting means to slide freely within said annular slot or for engaging said support unit to rotate with said drive unit by axially clamping the enlarged end of said connecting means within said annular slot.

* * * * *